United States Patent
Jain et al.

(10) Patent No.: US 9,783,967 B2
(45) Date of Patent: Oct. 10, 2017

(54) BASIN WTH ACCESSORY SYSTEM

(71) Applicant: Kohler Co., Kohler, WI (US)

(72) Inventors: Anushree Jain, Oak Brook, IL (US); Terrence Mahon, Whitefish Bay, WI (US); Sarah O'Brien, Plymouth, WI (US)

(73) Assignee: KOHLER CO., Kohler, WI (US)

( * ) Notice: Subject to any disclaimer, the term of this patent is extended or adjusted under 35 U.S.C. 154(b) by 779 days.

(21) Appl. No.: 13/870,775

(22) Filed: Apr. 25, 2013

(65) Prior Publication Data

US 2013/0283521 A1    Oct. 31, 2013

Related U.S. Application Data

(60) Provisional application No. 61/638,653, filed on Apr. 26, 2012.

(51) Int. Cl.
    *E03C 1/186*    (2006.01)
    *E03C 1/18*    (2006.01)
    *A47J 47/20*    (2006.01)

(52) U.S. Cl.
    CPC .................. *E03C 1/18* (2013.01); *A47J 47/20* (2013.01)

(58) Field of Classification Search
    CPC ......... A47J 37/1271; A47J 47/20; E03C 1/18; E03C 1/186
    USPC ............... 134/82–85; 211/119.009, 119.011, 211/41.1–41.9, 85.25, 126.15; 4/548, 4/619, 628, 631, 637, 654, 656, 658; 68/229, 233; D7/667, 668
    See application file for complete search history.

(56) References Cited

U.S. PATENT DOCUMENTS

| | | | |
|---|---|---|---|
| 917,278 A | 4/1909 | Fike | |
| 3,622,032 A | 11/1971 | Tilche | |
| D266,281 S * | 9/1982 | Ellis | ............................... D32/56 |
| 4,456,021 A * | 6/1984 | Leavens | .................. E03C 1/182 |
| | | | 134/115 R |
| 5,341,953 A | 8/1994 | Forester | |
| 5,381,562 A | 1/1995 | Holloway et al. | |
| 5,984,129 A | 11/1999 | Pasinski | |
| 7,305,723 B2 * | 12/2007 | Fulks | .................... A47J 47/005 |
| | | | 4/631 |
| 7,568,239 B2 * | 8/2009 | Spruner von Mertz | ................... |
| | | | A47J 47/005 |
| | | | 4/654 |
| 7,647,654 B2 * | 1/2010 | Shamroth | ............... E03C 1/186 |
| | | | 220/801 |
| 7,703,631 B2 | 4/2010 | Chafe et al. | |
| 7,854,030 B2 * | 12/2010 | Lee | .......................... A47K 1/00 |
| | | | 211/41.3 |

(Continued)

FOREIGN PATENT DOCUMENTS

| CN | 201750889 | | 2/2011 | |
| DE | 10262179 | * | 5/2006 | .............. A47J 47/20 |

OTHER PUBLICATIONS

Notification of First Office Action for Chinese Application No. 201310148598.4 (dated Jun. 24, 2014).

*Primary Examiner* — Allana Lewin Bidder
*Assistant Examiner* — Nicholas Ros
(74) *Attorney, Agent, or Firm* — Foley & Lardner LLP

(57) ABSTRACT

An accessory system for a sink basin includes a support structure and an accessory. The support structure includes two or more spaced-apart elongated supports. The elongated supports are configured to support the accessory within the basin at different heights above a bottom of the basin.

30 Claims, 8 Drawing Sheets

(56) References Cited

U.S. PATENT DOCUMENTS

| | | |
|---|---|---|
| 2002/0027091 A1 | 3/2002 | Brown |
| 2004/0206761 A1 | 10/2004 | Frantz |
| 2008/0148475 A1* | 6/2008 | Lin .......................... E03C 1/18 4/631 |
| 2010/0275369 A1* | 11/2010 | Eilmus .................... A47J 47/20 4/631 |
| 2012/0204343 A1* | 8/2012 | Shollmier ................. E03C 1/18 4/631 |

* cited by examiner

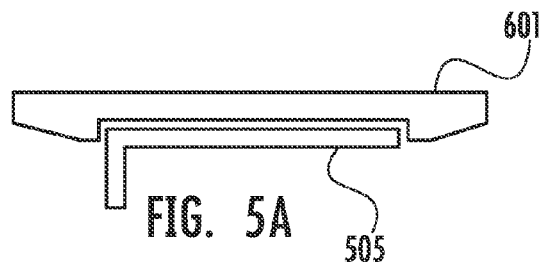
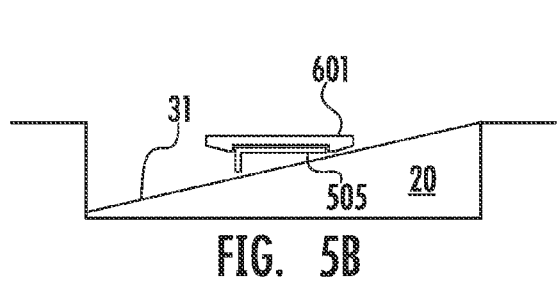
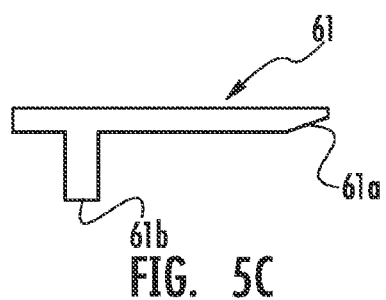
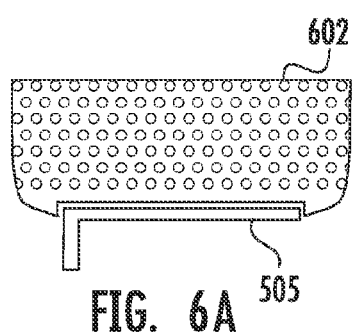
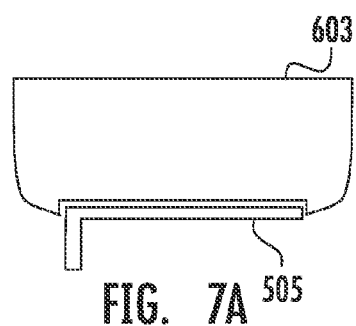
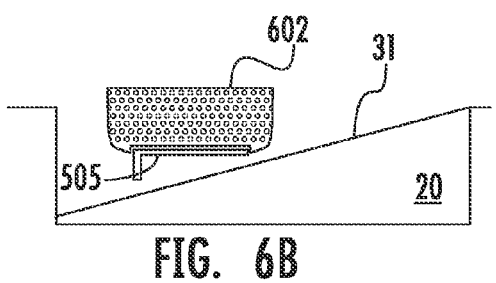
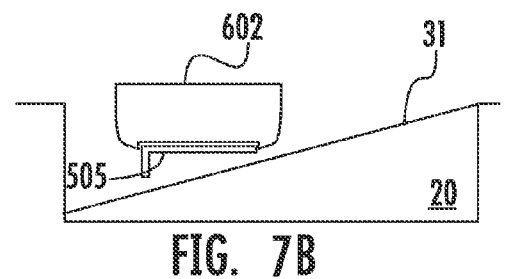
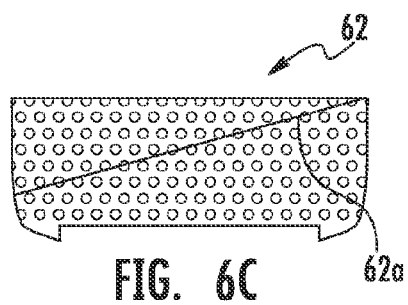
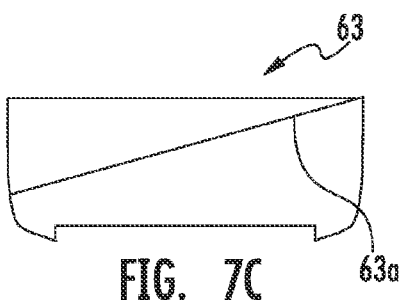

BASIN WTH ACCESSORY SYSTEM

PRIORITY CLAIM

This application claims priority to and the benefit of U.S. Provisional Application No. 61/638,653, filed on Apr. 26, 2012, the entire disclosure of which is hereby incorporated by reference in its entirety.

BACKGROUND

The present disclosure relates generally to the field of basins that hold liquids, such as sinks or tubs. More particularly, the present disclosure relates to the configuration of such basins and to accessories for use with such basins.

Kitchen sinks, bathroom sinks, and other types of basins are typically provided in fixed positions, including fixed heights, meaning that the top (e.g., rim or deck) of the basin and the bottom of the basin cannot be adjusted in height according to preferences or needs of a particular user. For example, while a basin may be positioned at a standard or otherwise preferred height for one user, such as an able-bodied adult, it may be difficult for another person, such as a small child, or elderly or disabled person, to use. Accordingly, it would be desirable to provide an accessory system that could be adjusted in height to better accommodate persons of different size and/or physical ability.

SUMMARY

According to an exemplary embodiment, an accessory system for a basin generally includes a support structure and an accessory, such as an adjustable or movable platform, or other type of utility device or structure. The support structure is configured to support the accessory within the basin at different heights.

According to an exemplary embodiment, an accessory for a basin generally includes a first extension and a second extension. The second extension is coupled to the first extension to form a generally L-shaped cross-section. The accessory is configured to engage a support structure within the basin at varying heights.

According to an exemplary embodiment, a basin generally includes a bottom, a first wall, a second wall, and a support structure. The first wall and the second wall extend generally upwardly from the bottom. The support structure is configured to support an accessory, such as an adjustable or movable platform, or other type of utility device or structure, at different heights. The support structure includes a first support surface that is coupled to the first wall and a second support surface that is coupled to the second wall. The first support surface and the second support surface define an inclined plane.

According to an exemplary embodiment, an accessory system for a sink basin includes a support structure and an accessory. The support structure includes two or more spaced-apart elongated supports. The elongated supports are configured to support the accessory within the basin at different heights above a bottom of the basin.

According to an exemplary embodiment, a sink basin includes a bottom, a first wall, a second wall, and a support structure. The first wall extends generally upward from the bottom. The second wall extends generally upward from the bottom and being generally parallel to the first wall. The support structure is configured to support an accessory within the sink basin at a variety of different heights above the bottom. The support structure includes a first support surface adjacent to the first wall and a second support surface adjacent to the second wall, the first support surface and the second support surface being formed integrally with the sink basin.

BRIEF DESCRIPTION OF THE DRAWINGS

FIG. 5A is a front view of an accessory with a cutting board according to an exemplary embodiment.

FIG. 5B is a front view of a basin with the accessory and cutting board according to the exemplary embodiment of FIG. 5A.

FIG. 5C is a front view of an accessory configured as a cutting board according to an exemplary embodiment.

FIG. 6A is a front view of an accessory with a colander according to an exemplary embodiment.

FIG. 6B is a front view of a basin with the accessory and colander according to the exemplary embodiment of 6A.

FIG. 6C is a front view of an accessory configured as a colander according to an exemplary embodiment.

FIG. 7A is a front view of an accessory with a container according to an exemplary embodiment.

FIG. 7B is a front view of a basin with the accessory and container according to the exemplary embodiment of 7A.

FIG. 7C is a front view of an accessory configured as a container according to an exemplary embodiment.

DETAILED DESCRIPTION

Figure 1A:
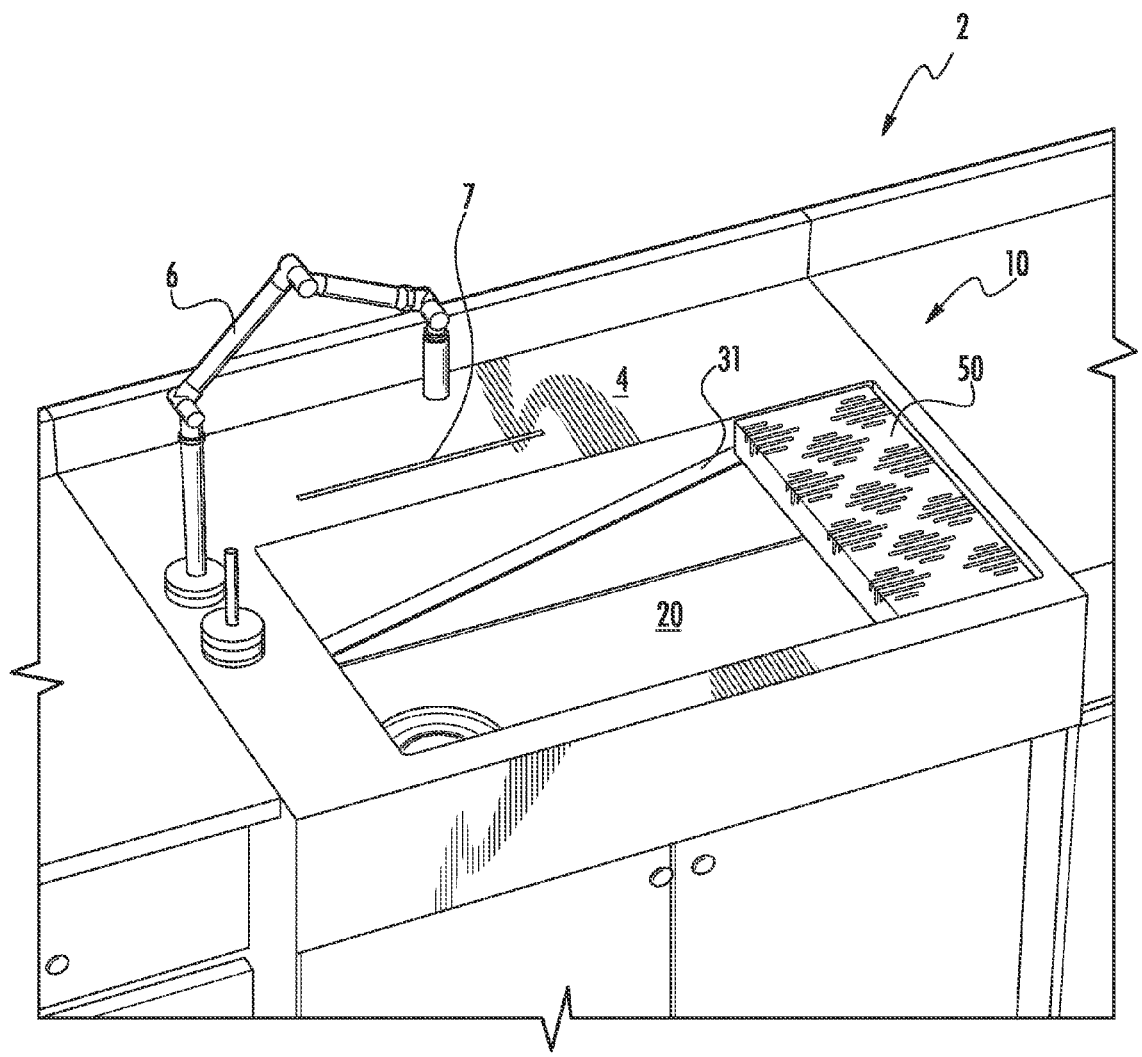
FIG. 1A is a perspective view of a basin with an accessory system according to an exemplary embodiment.
Figure 1B:
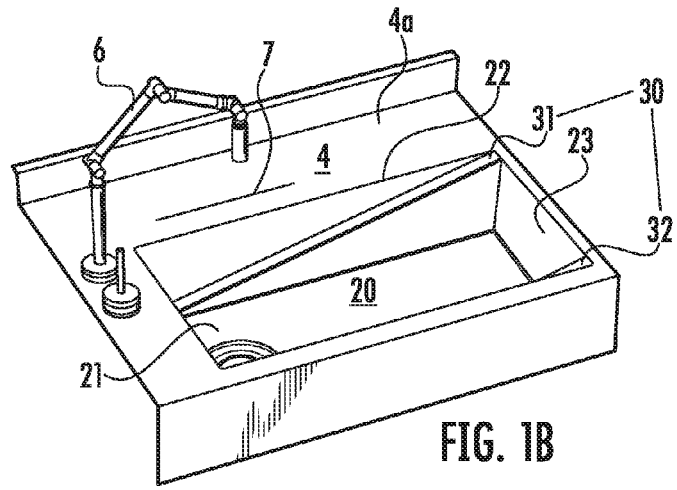
FIG. 1B is a perspective view of a basin with a support structure according to an exemplary embodiment.

According to an exemplary embodiment shown in FIGS. 1A and 1B, an accessory system 10 is provided for a sink basin or other type of basin 20, such as a tub. The accessory system 10 includes a support structure 30 and an accessory 50 (e.g., a platform, or other type of utility device or structure), the support structure being configured to support the accessory over a floor or bottom 21 of the basin 20 at varying heights.

Figure 2A:
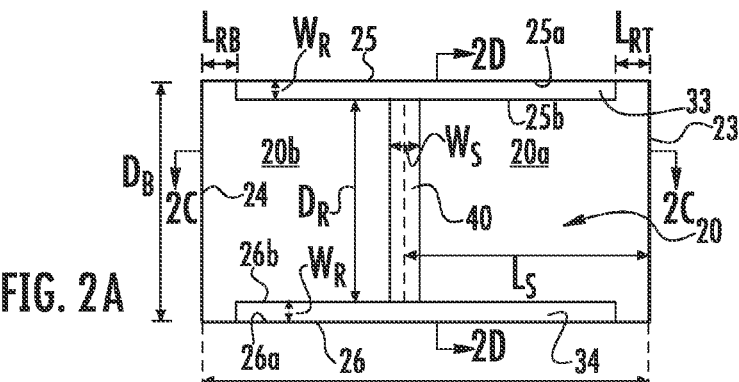
FIG. 2A is a top schematic view of a basin with a support structure according to an exemplary embodiment.
Figure 2B:
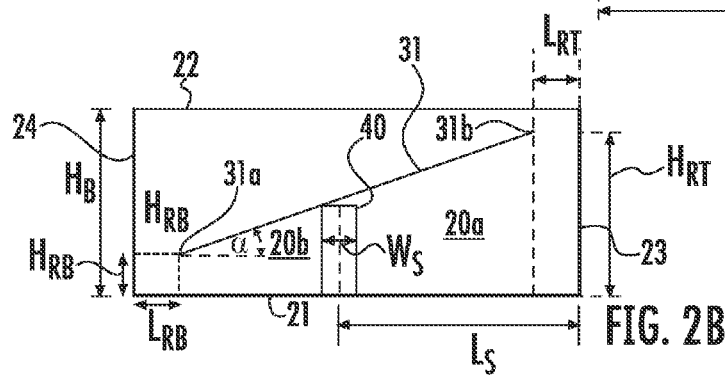
FIG. 2B is a front, cross-sectional schematic view of the basin with the support structure according to the exemplary embodiment shown in FIG. 2A.
Figure 2C:
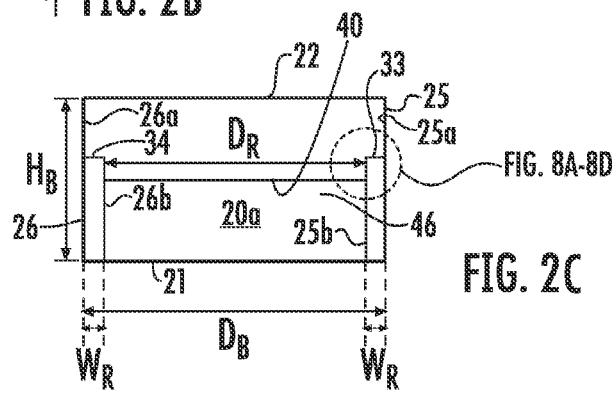
FIG. 2C is a side, cross-sectional schematic view of the basin with the support structure according to the exemplary embodiment shown in FIG. 2A.

According to an exemplary embodiment shown in FIGS. 2A-2C, the sink basin 20 generally includes a floor or bottom 21, a rim 22, first and second side walls 23, 24 that extend generally upward from the bottom 21 to the rim 22, and first and second end walls 25, 26 that extend generally upward from the bottom 21 to the rim 22. The bottom 21 is illustrated as being generally flat and horizontal but may be sloped or otherwise configured so as to direct water toward a drain (not shown). The rim 22 is generally horizontal and is positioned above the bottom at a height $H_B$. The rim 22 may be configured, for example, such that the basin 20 may be an under mount sink, top mount or self-rimming sink, full depth top mount sink (i.e., entirely interrupts a counter surface), or may transition into and form all or a portion of a counter surface. The side walls 23, 24 are generally vertical and planar, and are positioned generally opposite each other, being spaced apart a lateral distance $L_B$. The end walls 25, 26 are also generally vertical and planar, and are similarly positioned generally opposite each other, being spaced apart a lateral distance $D_B$. The dimensions of the basin 20 may be selected according to intended or contemplated uses or users of the accessory system 10, or may be standard sizes and dimensions (e.g., to correspond with standard cabinet sizes). For example, $H_B$ may be between approximately 6" and 12" or any other suitable dimension, $L_B$ may be between approximately 10" and 60" or any other suitable dimension, and $D_B$ between approximately 10" and 30" or any other suitable dimension. Further, the basin 20 may be elevated above a floor (e.g., a kitchen floor) to provide clearance under the bottom 21 of the basin 20 and/or to provide the rim 22 at a desired height (e.g., a standard or custom counter height). For example, the bottom 21 of the basin 20 may be positioned between approximately 22" and 28" or any other suitable height above a floor, and the rim 22 of the basin 20 may be positioned between approximately 32" and 40" or any other suitable height above a floor. According to other exemplary embodiments, the basin 20 may be configured with other dimensions including, for example, longer or shorter, wider or narrower, deeper or shallower, and/or lower or taller depending on the particular use (e.g., as kitchen sink, bathroom sink, utility sink, bathtub, etc.).

According to other exemplary embodiments, the basin 20 may be configured in other manners including, for example, having a different configuration for the bottom 21 (e.g., sloped, curved or contoured, or otherwise non-horizontal), a different configuration for the rim 22 (e.g., sloped, curved or contoured, or otherwise non-horizontal), a different wall configuration (e.g., more or fewer, curved or otherwise non-planar, sloped or otherwise non-vertical), and the like.

According to an exemplary embodiment, the basin 20 may also include a saddle 40 (e.g., a wall or divider) configured to divide the basin 20 into chambers 20a and 20b, as shown in FIG. 2A-2C. The saddle 40 has a width $W_S$ (e.g., between approximately 1" and 3" or any other suitable dimension) and may have a rounded, flat, or other profile. The saddle 40 is spaced a lateral distance $L_S$ from the side wall 23 (e.g., 50% or 60% of $L_B$), such that the chambers 20a, 20b may be of equal or unequal size. According to other exemplary embodiments, the basin 20 may be configured in other manners including, for example, having no saddle to provide only a single chamber (e.g., as shown in the exemplary embodiments of FIGS. 1A and 1B), providing more than one saddle to provide more than two chambers, providing a movable saddle and the like.

According to an exemplary embodiment, the support structure 30 generally includes two spaced-apart, elongated supports or rails 31, 32 positioned generally within the basin 20. The elongated supports or rails 31, 32 each include an upper surface or support surface 33, 34, respectively, configured to engage and support accessory 50, with the accessory 50 extending or spanning the distance between the rails 31, 32 (e.g., extending between upper surfaces of the elongated supports or rails) so as to be supported or suspended above the bottom 21 of the basin 20 at different heights. The rails 31, 32 are inclined, such that the upper surfaces 33, 34 thereof generally define a plane on which the accessory 50 may be moved to different heights (e.g., inner edges of the upper support surfaces define an inclined plane extending therebetween). Configured in this manner, both a horizontal position and a vertical position of the accessory within the sink basin may be adjusted by moving the accessory on the elongated supports. For example, adjusting the vertical position may also require changing the horizontal position of the accessory 50. For example, a user may slide the accessory 50 along the upper surfaces 33, 34 of the rails 31, 32 (e.g., between a first position within the basin 20 and a second position within the basin 20) to change the height of the accessory 50 (e.g., the first position being lower than the second position).

According to an exemplary embodiment, a first elongated support or rail 31 is positioned proximate or adjacent the first end wall 25 of the basin 20, and a second elongated support or rail 32 is positioned proximate or adjacent the second end wall 26 of the basin 20, with the first rail 31 and second rail 32 being generally opposite each other and spaced apart from each other by a generally constant lateral distance $D_R$. Each of the elongated supports or rails 31, 32 is inclined upward at an angle α from a lower end 31a, 32a in the basin 20 to an upper end 31b, 32b that is generally opposite the lower end 31a, 32a (i.e., inclined relative to the bottom 21 of the basin 20 in a direction between the first and second side walls 23, 24). The lower ends 31a, 32a may be positioned in a lower corner of the basin 20 (i.e., at the intersection of the end walls 25, 26, side wall 23, and bottom 21 of the basin 20), or may be spaced from the end wall 23 a lateral distance $L_{RB}$ and spaced vertically above the bottom 21 a vertical height $H_{RB}$. The upper ends 31b, 32b may similarly be positioned in an upper corner of the basin 20 (i.e., at the intersection of the end walls 25, 26, side wall 24, and rim 22 of the basin 20), or may be spaced apart from the end wall 23 a lateral distance $L_{RT}$ and spaced vertically above the bottom 21a vertical height $H_{RT}$, which may be above or below the rim 22. The rails 31, 32 may also be configured such that the upper surfaces 33, 34 thereof are positioned above the saddle 40. Further, each of the elongated supports or rails 31, 32 may extend inward from the end walls 25, 26 of the basin 20 a width $W_R$. Configured in this manner, the rails 31, 32 provide support surfaces for the accessory 50 in a range of positions within the basin 20 and, as a result, in a range of heights above a floor.

According to an exemplary embodiment, the lower ends 31a, 32a of the rails 31, 32 are positioned such that $L_{RB}$ is between approximately 0" and 30" and more preferably between 0" and 6", or any other suitable dimension, while $H_{RB}$ is between approximately 0" and 12" and more preferably between 0" and 3", or any other suitable dimension. The upper ends 31b, 32b are positioned such that $L_{RT}$ is between approximately 0" and 30" and more preferably between 0" and 6", or any other suitable dimension, while $H_{RT}$ is between approximately 0" and 12" and more preferably between 0" and 3", or any other suitable dimension. So configured, the rails 31, 32 may allow the accessory 50 to be adjusted to between approximately 28" and 36" or any other suitable or desired height above a floor. The lateral distance $D_R$ between the rails 31, 32 is preferably between approximately 0" and 40" and more preferably between 0" and 20", or any other suitable dimension. The width $W_R$ of the rails 31, 32 is preferably between approximately 0" and 4" and more preferably between 0" and 2", or any other suitable dimension. The angle α of the rails 31, 32 is preferably between approximately 0 degrees and 90 degrees and more preferably between 5 degrees and 30 degrees, or any other suitable angle. According to other exemplary embodiments, the support structure 30 and the rails 31, 32 may be configured with other dimensions including, for example, greater or lesser distance from the top or bottom or the basin, length, angle, or lateral spacing depending on the particular use (e.g., as kitchen sink, bathroom sink, utility sink, bathtub, etc.), dimensions of the basin 20, and orientation (e.g., if rails 31, 32 are adjacent end walls 25, 26 or side walls 23, 24).

Figure 3A:
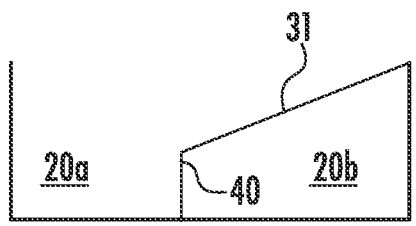
FIG. 3A is a front schematic view of a basin with a support structure according to an exemplary embodiment in a second configuration.
Figure 3E:
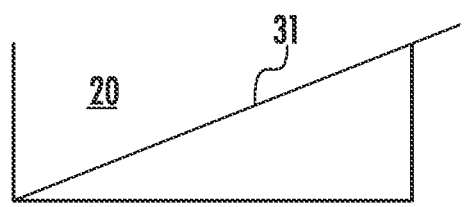
FIG. 3E is a front schematic view of a basin with a support structure according to an exemplary embodiment in a sixth configuration.
Figure 3B:
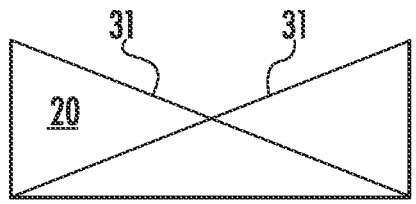
FIG. 3B is a front schematic view of a basin with a support structure according to an exemplary embodiment in a third configuration.
Figure 3F:
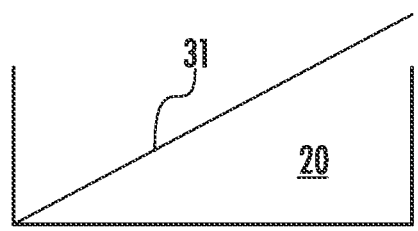
FIG. 3F is a front schematic view of a basin with a support structure according to an exemplary embodiment in a seventh configuration.
Figure 3C:
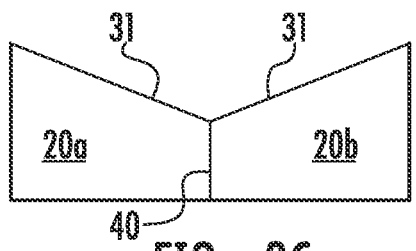
FIG. 3C is a front schematic view of a basin with a support structure according to an exemplary embodiment in a fourth configuration.
Figure 3G:
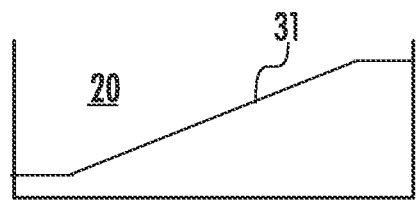
FIG. 3G is a front schematic view of a basin with a support structure according to an exemplary embodiment in an eighth configuration.
Figure 3D:
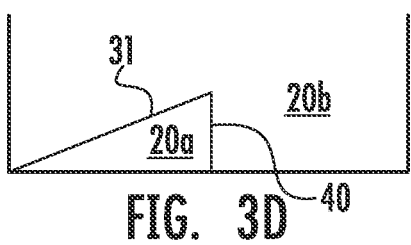
FIG. 3D is a front schematic view of a basin with a support structure according to an exemplary embodiment in a fifth configuration.
Figure 3H:
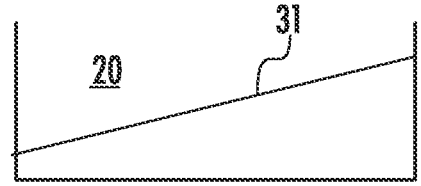
FIG. 3H is a front schematic view of a basin with a support structure according to an exemplary embodiment in a ninth configuration.
Figure 4A:
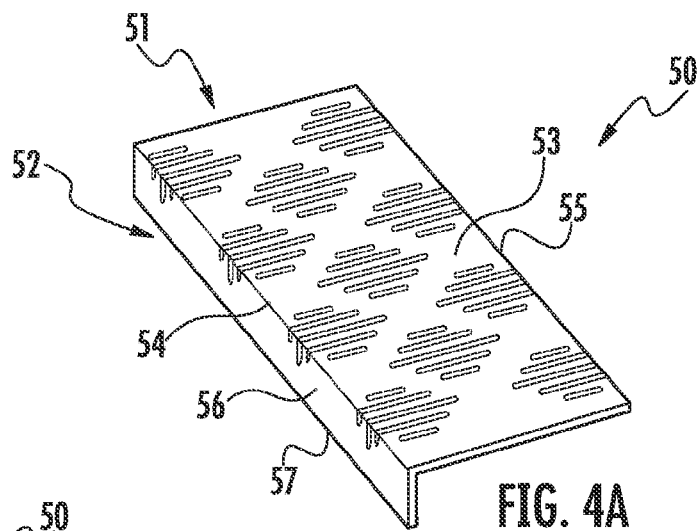
FIG. 4A is a perspective view of an accessory according to an exemplary embodiment.
Figure 4B:
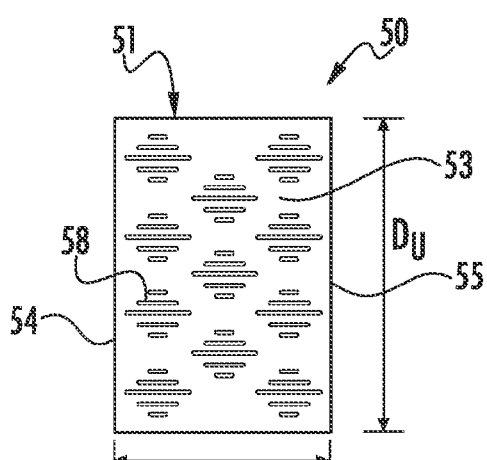
FIG. 4B is a top view of the accessory according to the exemplary embodiment shown in FIG. 4A.
Figure 4C:
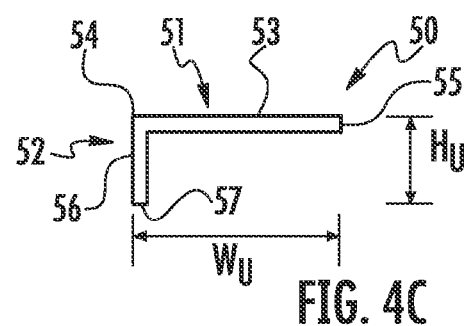
FIG. 4C is a front view of the accessory according to the exemplary embodiment shown in FIG. 4A.
Figure 4D:
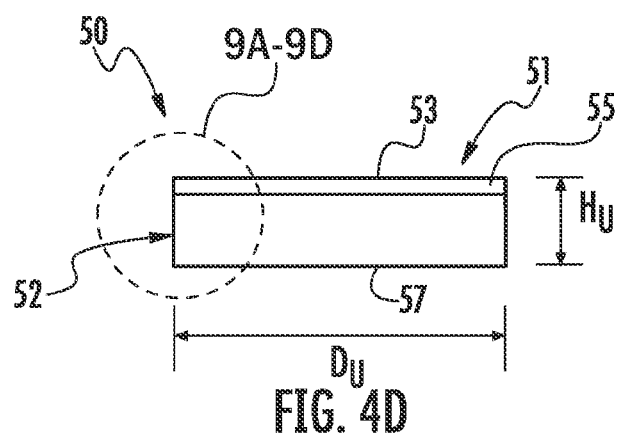
FIG. 4D is a side view of the accessory according to the exemplary embodiment shown in FIG. 4A.

While the rails 31, 32 are depicted being upwardly sloped from left to right in FIGS. 1A-2C, it is also contemplated that the rails 31, 32 may slope upwardly from right to left, front to back, or back to front. According to other exemplary embodiments, the rails 31, 32 may be provided in other configurations as shown, for example, in the schematics of FIG. 3A-3F. For example, the rail 31 and opposite rail (not shown) may extend from a central portion of the basin 20, such as from the saddle 40, upward (as shown in FIG. 3A). The rail 31 may be provided sloping in multiple directions including, for example, rails 31 crossing at a central point and continuing upward (as shown in FIG. 3B), or rails 31 originating at a central point and extending upward in opposite directions (as shown in FIG. 3C). The rail 31 may extend from a bottom corner and terminate at a central point, such as at the saddle 40 (as shown in FIG. 3D). The rail 31 may extend beyond the rim of the basin 20 (as shown in FIG. 3E). The rails 31 may also extend above the rim of the basin 20 (as shown in FIG. 3F). The rail 31 may extend inwardly from opposite walls in a generally horizontal manner before being inclined (as shown in FIG. 3G), for example, each rail being elongated in a direction extending generally horizontally away from a first wall and then in a direction inclined away from the first wall. The rail 31 may be inclined from a side wall originating from a position above the bottom of the basin (as shown in FIG. 3H).

According to an exemplary embodiment, the elongated supports or rails 31, 32 are formed integrally with the basin 20. For example, the rails 31, 32 may be formed in the end walls 25, 26 during formation of the basin 20, such as through a stamping, casting, or molding operation. Formed in this manner, the interior of the basin 20 is defined by the upper surfaces 33, 34 of the rails 31, 32, and upper interior surfaces 25a, 26a and lower interior surfaces 25b, 26b of the end walls 25, 26 (i.e., the interior surfaces of the ends walls 25, 26, respectively, above and below the upper surfaces 33, 34 of the rails 31, 32).

According to other exemplary embodiments, the rails 31, 32 may be formed and provided in other manners including, for example, providing the rails 31, 32 as elongated members that may be fixedly attached to the end walls 25, 26 of the basin 20. According to another exemplary embodiment, the rails 31, 32 may be provided as partial walls that may be fixedly attached to the end walls 25, 26 of the basin to provide a sloped or inclined upper surfaces 33, 34 of the rails 31, 32, such that the upper interior surfaces 25a, 26a are provided by the end walls 25, 26 and lower interior surfaces 25b, 26b are provided by the partial walls of the rails 31, 32. According to yet another exemplary embodiment, the rails 31, 32 may be provided as removable units that may engage or positively couple to the basin 20, such as extending upward from an intersection between the end wall 25 or saddle 40 and the bottom 21 to the opposite end wall 26 or rim 22. According to still another exemplary embodiment, the rails 31, 32 are provided as a single structure that may be removed from and/or moved within the basin 20 as a unit.

According to an exemplary embodiment, the accessory 50 may be configured for various intended or contemplated uses, which may include, for example, use as a general work surface, shelf, cutting board, strainer or colander, drying rack, bowl, or a wash tub. As discussed in further detail below, depending on the intended or contemplated use, the accessory 50 may be configured with a certain shape, material, strength, or various other characteristics or features.

According to an exemplary embodiment, the accessory 50 is configured to provide a generally horizontal work surface. The work surface may be used for various purposes including, for example, as a platform or support for scrubbing dishes, as a shelf for resting objects (e.g., utensils, cleaning products, etc.), as a drying rack, or as a staging area (e.g., for food preparation). According to other exemplary embodiments in which the basin 20 is a bathtub, the accessory may be configured to provide a shelf or bench, such as to support a book, hygiene products (e.g., shampoo, soap, etc.), a bather, etc.

According to an exemplary embodiment, the accessory 50 may, for example, be a structure having a generally L-shaped cross section with first and second legs or extensions 51, 52 coupled to each other and configured to engage the upper surfaces of the rails 31, 32 (e.g., at varying heights relative to the bottom 21 of the sink basin 20). The first leg 51 defines a generally planar surface 53 that extends from a joint or corner 54 a first distance $W_U$ to a first end 55, and the second leg 52 defines a generally planar surface 56 that extends from the corner 54 a second distance $H_U$ to a second end 57. The first distance $W_U$, the second distance $H_U$, and angle of the corner may be configured such that, when the first end 55 and the second end 57 engage the rails 31, 32 (e.g., the first end 55 or first engaging feature is configured to simultaneously engage the support structure at first height that is different (e.g., higher) than a height that the second end 57 or second engaging feature engages the support structure), the first surface 53 is generally horizontal or sloped (e.g., forming the horizontal work surface, or a slightly sloped work surface of between approximately 0 and 5 degrees from horizontal (e.g., between approximately 0 and 3 degrees from horizontal) and the second surface 56 is generally vertical. The accessory 50 has a length $D_U$ sufficient to span the distance $D_R$ between the rails 33, 34 but less than or equal to the distance $D_B$ between the upper interior surfaces 25a, 26a of the end walls 25, 26. For example, the length $D_U$ of the accessory 50 may be greater than or equal to the distance $D_R$ and the width $W_R$ of one of the rails 33, 34 (e.g., to prevent the accessory 50 from falling or slipping between the rails 33, 34). According to other exemplary embodiments, the accessory 50 may be configured in other manners, such as without planar surfaces (e.g., non-planar surfaces, curved surfaces, irregular surfaces, or other structure such as a wire rack, etc.), surfaces at different angles (i.e., non-horizontal or more steeply sloped, non-vertical, irregular, etc.), structures with different cross-sectional shape (e.g., triangular, rectangular, curve-shaped, irregular, linear, circular, etc.), features other than ends for engaging the rails (e.g., edges, protrusions, etc.), or other configuration as may be appropriate depending on the intended or contemplated uses of the accessory 50 and the dimensions and orientation of the support structure 30 and rails 33, 34.

According to an exemplary embodiment, the length $W_U$ of the first leg 51 is between approximately 0" and 30" and more preferably between 4" and 16", or any other suitable dimension, while the length $H_U$ of the second leg 52 is between approximately 0" and 20" and more preferably between 0.5" and 4" or any other suitable dimension. It is contemplated that the accessory 50 may be configured as a generally flat or planar structure, for example, if the either of the lengths $W_U$ or $H_U$ are 0" or near 0".

According to an exemplary embodiment, the accessory 50 is suitable for use in a wet environment. For example, the accessory 50 is formed from materials having properties suitable for use in wet environments (e.g., non-corrosive, non-soluble, etc.). For example, the accessory may be a unitary, injection molded plastic structure. According to other exemplary embodiments, the accessory 50 may be made as a multi-piece structure (e.g., having two or more subcomponents detachably or permanently coupled to each other, such as with fasteners, adhesives, an interference or press-fit, positive coupling features, etc.), be made according to other manufacturing processes (e.g., compression molding, stamping, casting, extruding, combinations thereof, etc.), or be formed from other materials (e.g., glass-filled nylon, composites, metal such as stainless steel, aluminum, copper, enamel coated cast iron, wood, silicone, polypropylene, rubber, paperstone, suitable combinations thereof, etc.).

According to an exemplary embodiment, the accessory 50 is suitable for use with food. For example, the accessory 50 may include materials or otherwise be treated or formed in a manner advantageous for use with food (e.g., with material having anti-microbial properties, or material treated with anti-microbial additives).

According to an exemplary embodiment, the accessory 50 may be configured with varying strength depending on the intended or contemplated uses. For example, a stronger accessory 50 may be required for high force, dynamic, and/or more frequent uses (e.g., scrubbing dishes), and a less strong accessory 50 may be required for low force, static, and/or infrequent uses (e.g., drying dishes, rinsing food, etc.). Appropriate strength may be provided, for example, by use of different strength materials, different thickness materials, optimized shape (e.g., with an arc to account for expected deflection), and/or strengthening features (e.g., ribs), and the like.

According to an exemplary embodiment, the accessory 50 may be configured according to desired aesthetic or tactile characteristics. For example, the accessory 50 may have any of a variety of colors, designs or patterns, and/or finish or sheen. The accessory 50 may also have any of a variety of textures (e.g., smooth, brushed, patterned, etc.), or coatings (e.g., enamel, rubberized, polymeric, etc.). Such a coating or texture may also function to provide a desired level of friction between the accessory 50 and rails 31, 32 to prevent unintended movement.

According to an exemplary embodiment, the accessory 50 may be configured with various other functional characteristics or features. For example, the accessory 50 may include apertures 58 through or channels along the surfaces 53, 56 there of, which are configured to allow drainage or passage of water, other liquids, and small solids to a drain in the basin. The accessory 50, apertures 58, and/or channels may also have a slope to aid in the draining functionality.

As shown in FIGS. 5A-7C, according to various exemplary embodiments, an accessory may be configured as a chassis or support (e.g., the first extension being configured to provide a support) for another or second accessory or device having a general or specific use (e.g., a cutting board, colander or strainer, drying rack, container or bowl, etc.) Configured in this manner, the accessory or chassis 505 may provide a surface for placing or otherwise support the other accessories or devices thereon (i.e., on the support structure at different heights within the sink basin). The accessory or chassis 505 may also include various complementary features for securing the second accessory or device thereto or preventing or restricting relative movement therebetween (e.g., complementary male/female protrusion and recess, clips or other positive engaging features, complementary friction surfaces, other interfitting features, etc.). For example, as shown in the figures, the accessory may include a recess configured to receive at least a portion of the chassis therein. According to other exemplary embodiments, an accessory, itself, may be configured for a specific purpose. According to still other exemplary embodiments, an accessory may be configured for multiple uses. For example, an accessory may be configured to provide a general purpose work surface and function as a chassis, or may be configured to provide a general purpose work surface on an upper side thereof and also provide a container or vessel on an under side thereof (i.e., by flipping over the accessory). It is further contemplated that specific use accessories or devices, while being intended or configured for a specific use, may be used in other manners.

As shown in FIG. 5A-5C, according to two exemplary embodiments, an accessory may be configured to provide a cutting board. For example, as shown in FIGS. 5A and 5B, an accessory is configured as a chassis 505 for a cutting board 601. According to another example, an accessory, itself, is configured as a cutting board 61 (i.e., including a surface configured to act as a cutting board), the support structure being configured to support the cutting board at different heights within the sink basin. The cutting board 61 may be configured with an L-shaped cross-section (as described above) having ends 61*a*, 61*b* configured to engage the rails 31. Each of the cutting boards 601 and 61 are configured to provide a generally horizontal cutting surface, which may include a surface texture for preventing slipping of food, may be made of a durable material, and/or include an anti-microbial agent. According to other exemplary embodiments, the cutting boards 601 and 61 may include a wood cutting surface.

According to an exemplary embodiment, an accessory 50 may be configured as a drying rack. For example, the accessory 50 may provide apertures or other openings 58 to enable drainage of water from various dishes into the drain of the basin 20. The accessory 50 may further include various features for holding various types of utensils or dishes, such as upright posts or slots for holding plates or glasses, horizontal slots for holding the stems of wine glasses, baskets or slots for holding silverware or other utensils, etc. The accessory 50 may be made from the materials and manufacturing processes described above, or may be formed any other suitable material or process (e.g., bending wire similar to a dishwasher rack).

As shown in FIG. 6A-6C, according to two exemplary embodiments, an accessory may be configured to provide a strainer or colander. For example, as shown in FIGS. 6A-6B, an accessory is configured as a chassis 505 for a strainer or colander 602. According to another example, an accessory, itself, is configured as a strainer or colander 62, the support structure being configured to support the strainer or colander at different heights within the sink basin. The colander 62 includes one or more shoulders or protrusions 62*a* on either side thereof that are configured with a complementary incline and profile for engaging the rails 31, 32. Each of the colanders or strainers 602 and 62 may include a series of apertures configured to allow drainage of water from food or other objects placed therein. Each of the colanders or strainers 602 and 62 may be made from the manufacturing processes described above, or any other suitable material or process (e.g., a wire basket or screen in combination with a support structure).

As shown in FIG. 7A-7C, according to two exemplary embodiments, an accessory may be configured to provide a container or bowl. For example, as shown in FIGS. 7A-7B, an accessory is configured as a chassis 505 for a container or bowl 603. According to another exemplary embodiment, an accessory, itself, is configured as a bowl 63, the support structure being configured to support the bowl at different heights within the sink basin. The bowl 63 further includes one or more shoulders or protrusions 63*a* on either side thereof that are configured with a complementary incline and profile for engaging the rails 31, 32. Each of the bowls 603 and 63 may provide a compartment configured to contain water or another liquid, for example, to soak dishes or stage food for preparation.

According to an exemplary embodiment, the accessory 50 and rails 31, 32 are cooperatively configured for the accessory 50 to be adjusted to different heights generally within the basin 20. More particularly, the accessory 50 and rails 31, 32 may be configured to allow the accessory 50 to be moved along the rails 31, 32 to be adjusted in height relative to the bottom 21 of the basin 20 and a floor under the basin 20, while also preventing movement when the accessory 50 is being used. For example, various embodiments utilize friction to prevent movement while allowing infinite adjustability, while other embodiments may utilize features for positive engagement that may allow for incremental adjustability. According to other exemplary embodiments, the accessory 50 may instead or additionally be secured to the basin 20 or rails 31, 32 with an attachment device, such as suction cups or clamps.

According to an exemplary embodiment, the accessory 50 and rails 31, 32 are configured with complementary geometry. More particularly, the upper surfaces 33*a-d* of the rail 31 (shown in FIGS. 8A-8D according to several exemplary embodiments) and upper surfaces 34*a-d* of the rail 32 (not shown) may have a complementary shape to the ends 55*a-d*, 57*a-d* or other engaging features (e.g., edges, protrusions, etc.) of the accessories 50*a-d* (shown in FIGS. 9A-9D according to several exemplary embodiments). For example, the accessory 50 includes one or more engaging features that have a complementary profile configured to engage the upper surface of one or more of the elongated supports.

Figure 8A:
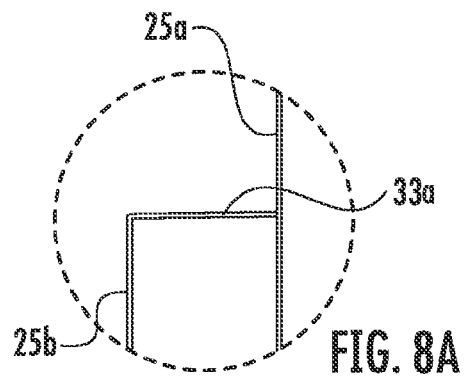
FIG. 8A is a partial side, cross-sectional schematic view of a support structure according to an exemplary embodiment.
Figure 9A:
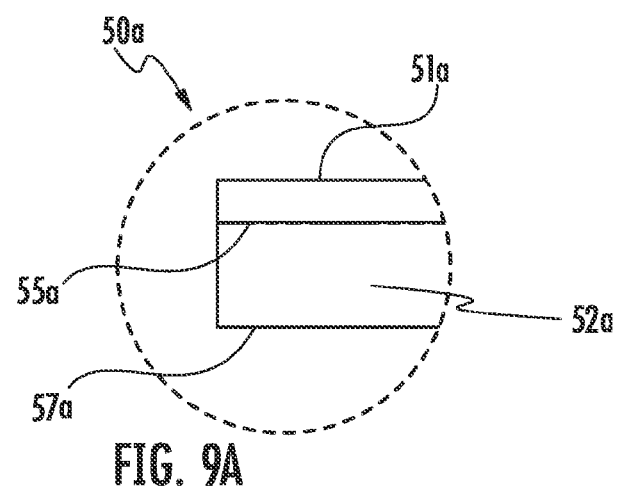
FIG. 9A is a partial side view of an accessory according to another exemplary embodiment.

According to the exemplary embodiment shown in FIG. 8A, the upper surface 33*a* of the rail 31 extends generally horizontally between the upper interior surface 25*a* and the lower interior surface 25*b*. As shown in FIG. 9A, the accessory 50*a* is shaped in a complementary manner with the end 55*a* of the first leg 51*a* and the end 57*a* of the second leg 52*b*, the ends 55*a* and 57*a* each being generally horizontal. Configured in this manner, friction between the upper surface 33*a* of the rail 31*a* and the ends 55*a*, 57*a* of the accessory 50*a* may prevent unintended movement of the accessory 50*a* along the rail 31.

Figure 8B:
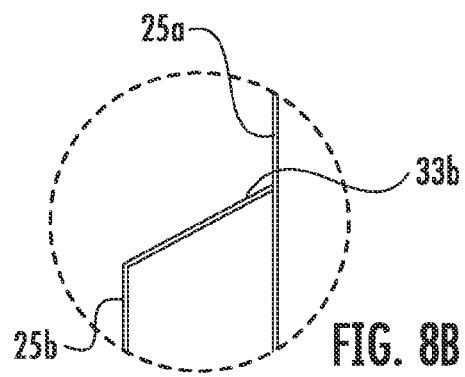
FIG. 8B is a partial side, cross-sectional schematic view of a support structure according to an exemplary embodiment.
Figure 9B:
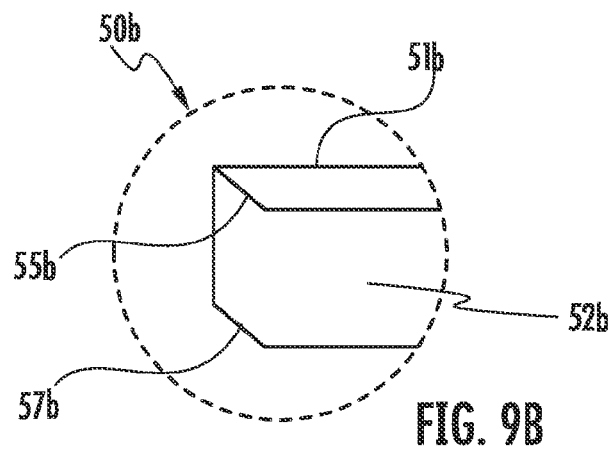
FIG. 9B is a partial side view of an accessory according to another exemplary embodiment.
Figure 9C:
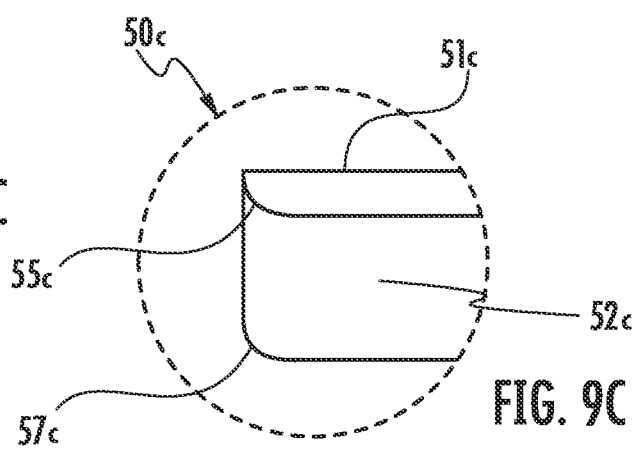
FIG. 9C is a partial side view of an accessory according to another exemplary embodiment.

According to another exemplary embodiment shown in FIG. 8B, the upper surface 33b of the rail may decline from the upper interior surface 25a to the lower interior surface 25b (i.e., the upper surface is angled downward from a wall of the sink basin toward an interior of the sink basin). As shown in FIG. 9B, the accessory 50b is shaped in a complementary manner with the end 55b of the first leg 51b and the end 57b of the second leg 52b being beveled or inwardly declining. Configured in this manner, downward force on the accessory 50b causes the accessory 50b to compress between the rail 31 and opposite rail (not shown) (e.g., like a wedge between upper surfaces of the elongated supports or rails), the inward pressure or compression further restricting unintended movement of the accessory 50b. According to another exemplary embodiment shown in FIGS. 8C and 9C, the upper surface 33c of the rail 31 may decline in a curved or scalloped manner (i.e., forming a concave or convex shape), so as to receive concave or convex end 55c of the first leg 51c and end 57c of the second leg 52c of the accessory 50c.

Figure 8C:
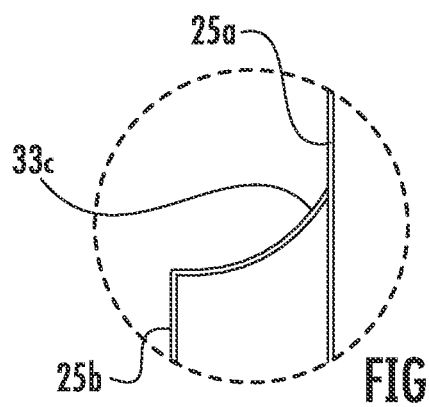
FIG. 8C is a partial side, cross-sectional schematic view of a support structure according to an exemplary embodiment.
Figure 8D:
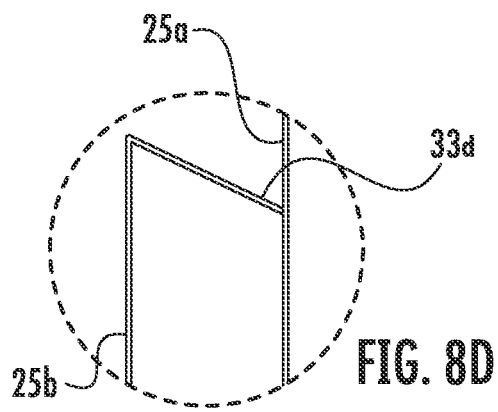
FIG. 8D is a partial side, cross-sectional schematic view of a support structure according to an exemplary embodiment.
Figure 9D:
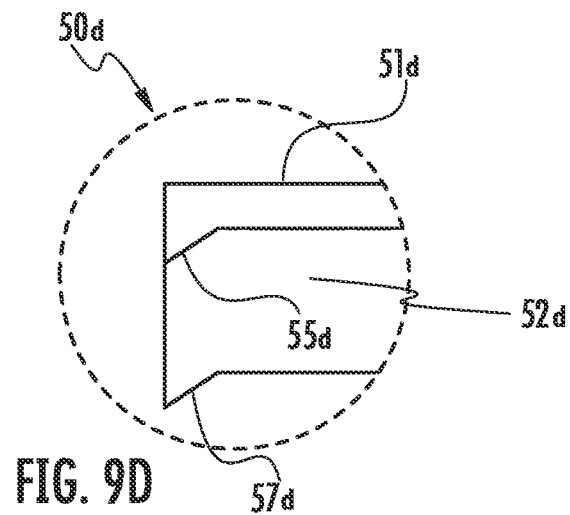
FIG. 9D is a partial side view of an accessory according to another exemplary embodiment.

According to yet another exemplary embodiment shown in FIGS. 8D and 9D, the upper surface 33d of the rail 31 may be inwardly inclined, with the ends 55d, 57d of the accessory 50d being inwardly inclined, such that the rail 31 and opposing rail (not shown) may be wedged between the end 55d of the first leg 51d and end 57d of the second leg 52d on each side of the accessory 50d.

According to an exemplary embodiment, the rails 31, 32 may be configured with complementary friction surfaces. For example, the upper surface of the rails 31, 32 and/or ends 55, 57 may be coated, textured, or otherwise provided with a desired friction surface to prevent relative movement of the accessory 50 along the rails 31, 32.

According to an exemplary embodiment, the rails 31, 32 and ends 55, 57 of the accessory 50 may include complementary features for positive engagement therebetween. For example, the rails 31, 32 and ends 55, 57 may include female features (e.g., slots, grooves, recesses, apertures, etc.) configured to receive complementary male features (e.g., tabs, ridges, posts, etc.). Further, intervening devices such as suction cups or clamps may be utilized to positively couple the accessory 50 to the rails 31, 32 or other part of the basin 20.

According to an exemplary embodiment, the accessory 50 may instead or additionally be configured to engage end walls 25, 26 to prevent relative movement therebetween. For example, the accessory 50 and elongated supports or end walls 25, 26 may have complementary positive engaging features (e.g., slots and tabs, apertures and posts, recesses and protrusions, etc.) to restrict or prevent relative movement. Further, the accessory 50 may be sized and/or include a coating or compressive material such that edges of the accessory 50 may the end walls 25, 26 to prevent relative movement and/or to create seal therebetween.

According to an exemplary embodiment, the support structure 30 and accessory 50 may be configured such that one or more accessories 50 may be placed within the basin in different orientations.

Figure 10A:
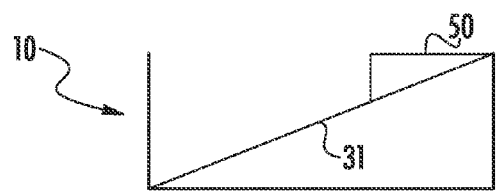
FIG. 10A is a front schematic view of a basin with an accessory according to an exemplary embodiment in a first orientation and in an upper position.
Figure 10B:
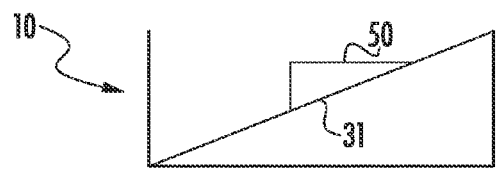
FIG. 10B is a front schematic view of a basin with an accessory according to an exemplary embodiment in a first orientation in an intermediate position.
Figure 10C:
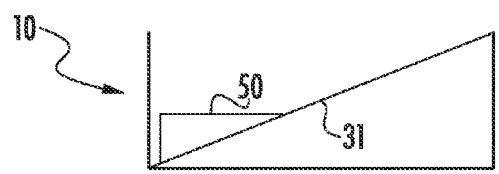
FIG. 10C is a front schematic view of a basin with an accessory according to an exemplary embodiment in a first orientation in a lower position.

For example, referring to FIGS. 10A-10C, a single accessory 50 may be placed on the rail 31 within the basin 20 to provide a generally horizontal surface and a generally vertical surface (i.e., a first orientation on the support structure with the first extension defining a generally horizontal surface and the second extension extending downward). More particularly, the accessory 50 may be placed in an upper position (FIG. 10A), a lower position (FIG. 10C), a position of intermediate height between the upper an lower positions (FIG. 10B), or at any other location. Oriented in this manner, the accessory 50 may, for example, provide a general purpose work surface to be used for scrubbing dishes, staging of food or utensils, drying dishes or utensils, etc. When in a lower position, a wall of the basin 20 may provide additional support to prevent movement of the accessory 50, and when an upper position, the rim or other wall of the basin 20 may also provide additional support to prevent movement.

Figure 11A:
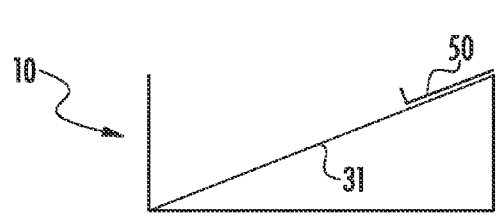
FIG. 11A is a front schematic view of a basin with an accessory according to an exemplary embodiment in a second orientation and in an upper position.
Figure 11B:
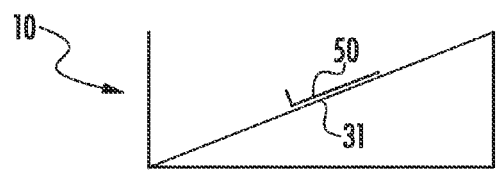
FIG. 11B is a front schematic view of a basin with an accessory according to an exemplary embodiment in a second orientation in an intermediate position.
Figure 11C:
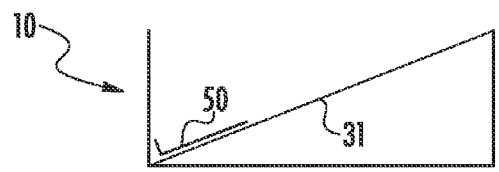
FIG. 11C is a front schematic view of a basin with an accessory according to an exemplary embodiment in a second orientation in a lower position.

Referring to FIGS. 11A-11C, a single accessory 50 may be placed on the rail 31 to provide a first surface generally parallel with the rail 31 and a second surface extending generally away from the rail 31 (i.e., a second orientation on the support structure with the first extension defining an inclined planar surface and the second extension extending upward, for example, with a continuous surface of the first extension engaging the support structure at different heights). The accessory 50 may be placed in an upper position (FIG. 11A), a lower position (FIG. 11C), a position of intermediate height between the upper an lower positions (FIG. 11B), or elsewhere. Oriented in this manner, the accessory 50 may, for example be used as a container for holding water, other liquids, and/or objects, be used for drying utensils or dishes, or be used for scrubbing dishes and prevent lateral movement of a dish having at least a portion positioned between the first and second surfaces.

Figure 12A:
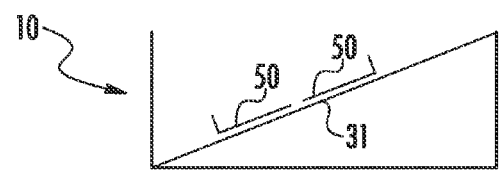
FIG. 12A is a front schematic view of a basin with two accessories according to an exemplary embodiment in the first orientation and a third orientation.
Figure 12B:
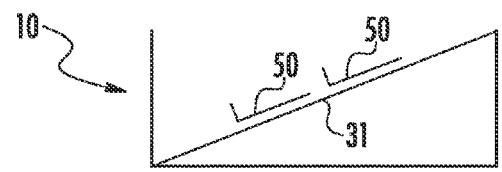
FIG. 12B is a front schematic view of a basin with two accessories according to an exemplary embodiment in the second orientation.
Figure 12C:
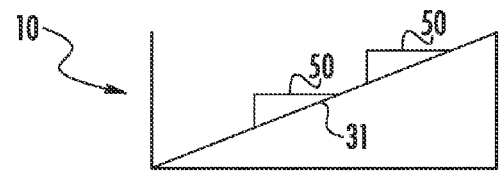
FIG. 12C is a front schematic view of a basin with two accessories according to an exemplary embodiment in the first orientation.

Referring to FIGS. 12A-12C, two or more accessories 50 may be placed on the rail 31. The accessories 50 may, for example, provide a combined extended surface parallel with the rail 31 (FIG. 8A) (i.e., in the first orientation and a third orientation), provide two basins (FIG. 8B) (i.e., in the second orientation), or provide two horizontal work surfaces (FIG. 8C) (i.e., in the first orientation) amongst other combinations.

Figure 13A:
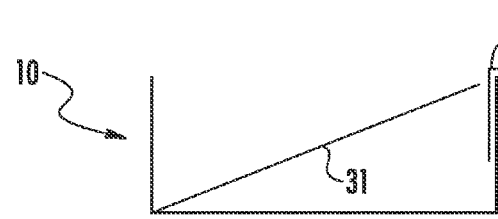
FIG. 13A is a front schematic view of a basin with an accessory according to an exemplary embodiment in fourth orientation.
Figure 13B:
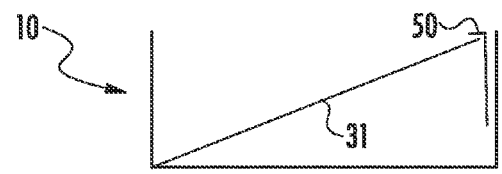
FIG. 13B is a front schematic view of a basin with an accessory according to an exemplary embodiment in a fifth orientation.
Figure 13C:
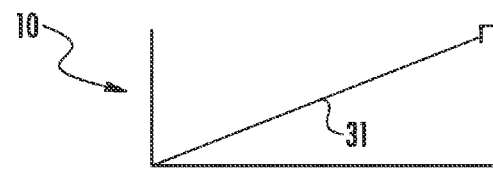
FIG. 13C is a front schematic view of a basin with an accessory according to an exemplary embodiment in a sixth orientation.

Referring to FIGS. 13A-13C, the rail 31 and opposite rail (not shown) may be configured to provide a vertical slot, such as an interruption in the rails or a vertical gap located between the side wall 23 and the rail 31, configured to receive one of the legs 51, 52 of the accessory 50. Configured in this manner, the rail 31 may support the accessory 50 in various orientations for storing the accessory 50 or for various other uses. For example, the accessory 50 may be oriented with the first leg extending downward into the slot, such that the second leg forms a generally horizontal platform or surface extending above and past the rim of the basin 20 (FIG. 13A) (i.e., in a fourth orientation), for example, to provide a work surface outside the basin 20. The accessory 50 may be oriented with the first leg extending downward into the slot, such that the second leg forms a generally horizontal platform above the floor of the basin (FIG. 13B) (i.e., a fifth orientation), for instance, to dry the accessory 50 after use, store the accessory 50, or provide a short work surface. The accessory 50 may also be oriented with the second leg extending downward into the slot, such that the first leg forms a generally horizontal platform extending above and past the rim of the basin 20 (FIG. 13C) (i.e., in a sixth orientation), for example, to provide a longer work surface outside the basin 20.

According to an exemplary embodiment, the accessory system 10 is configured as part of a system 2 that includes basin 20, the accessory system 10, and a counter 4. The system 2 may also include a faucet 6.

According to an exemplary embodiment, the counter 4 is configured to be used cooperatively with the accessory system 10. For example, the counter 4 may provide a staging area 4a positioned behind the basin that may be used for placing dishes, utensils, food, or other objects that are to be placed in the basin 20 or on the accessory 50. The counter 4 may also be configured to store the accessory 50, such as in a slot 7, when not in use and may further be configured to store or stage other general or specific use accessories or devices.

According to an exemplary embodiment, the faucet 6 may be positioned to accommodate particular uses or users. For example, the faucet 6 may be centered behind the basin 20 or biased toward one side, or maybe centered on one side of the basin 20 or biased toward one end. By positioning the faucet 6 in these manners, the faucet 6 may be more easily accessed or used by people of different sizes and/or different physical abilities and may also allow for more convenient use of the faucet 6 with the accessory 50 (e.g., by placing the faucet 6 to be easily accessible when and where needed or be out of the way when and where intrusive).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A sink basin, comprising:
a bottom;
opposing first and second end walls extending generally upward from the bottom;
opposing first and second side walls extending between the first and second end walls, each of the first and second side walls extending generally upward from the bottom; and
a support structure configured to support an accessory within the sink basin at a variety of different heights above the bottom;
wherein the support structure includes a first support surface adjacent to the first end wall and a second support surface adjacent to the second end wall, the first support surface and the second support surface being formed integrally with the sink basin; and
wherein each of the first support surface and the second support surface defines a lower end in the basin and an opposing upper end, forming an upward incline from the lower end to the upper end.

2. The sink basin of claim 1, wherein inner edges of the first support surface and the second support surface define an inclined plane.

3. The sink basin of claim 1, wherein the first support surface is angled downward from the first end wall toward an interior of the sink basin, and the second support surface is angled downward from the second end wall toward an interior of the sink basin.

4. The sink basin of claim 3, wherein the first support surface and the second support surface are generally planar.

5. An accessory system for a sink basin, comprising:
a support structure comprising:
a first support surface adjacent to a first end wall of the basin;
a second support surface adjacent to a second end wall of the basin opposing the first end wall of the basin;
wherein the first support surface and the second support surface are formed integrally with the basin; and
wherein each of the first support surface and the second support surface defines a lower end in the basin and an opposing upper end, forming an upward incline from the lower end to the upper end; and
an accessory comprising a first extension and a second extension coupled to the first extension to form a generally L-shaped cross-section;
wherein each of the elongated supports is inclined relative to a bottom of the basin such that each elongated support is configured to allow for positioning of the accessory within the basin at different heights above the bottom of the basin;
wherein an end of the first extension is configured to engage each of the elongated supports at a first height above the bottom of the basin; and
wherein an end of the second extension is configured to engage each of the elongated supports at a second height above the bottom of the basin.

6. The accessory system of claim 5, wherein the height of each of the support surfaces above the bottom varies based on a horizontal position in the basin, such that both a horizontal position and a vertical position of the accessory within the basin may be adjusted by moving the accessory on the support surfaces.

7. The accessory system of claim 6, wherein adjusting the vertical position of the accessory within the basin requires changing the horizontal position of the accessory on the support structure.

8. The accessory system of claim 5, wherein:
the first and second end walls are positioned generally opposite each other and wherein the basin includes first and second side walls positioned generally opposite each other.

9. The accessory system of claim 8, wherein the first support surface includes an upper surface extending inward from the first end wall, and the second support surface includes an upper surface extending inward from the second end wall.

10. The accessory system of claim 5, wherein each support surface is spaced apart from another support surface by a generally constant distance.

11. The accessory system of claim 5, wherein the support surfaces are integrally-formed with the basin.

12. The accessory system of claim 5, wherein the accessory is configured to extend between upper surfaces of the support surfaces.

13. The accessory system of claim 5, wherein each of the support surfaces includes an upper surface that is angled downward from a wall of the basin toward an interior of the basin.

14. The accessory system of claim 13, wherein the accessory includes one or more engaging features that have a complementary profile configured to engage the upper surface of one of the support surfaces.

15. The accessory system of claim 14, wherein a downward force on the accessory compresses the accessory between the upper surfaces of the support surfaces.

16. The accessory system of claim 13, wherein the accessory and the support surfaces include complementary features configured for positive engagement to prevent relative movement therebetween.

17. The accessory system of claim 5, wherein the accessory includes a first engaging feature and a second engaging feature, the first engaging feature configured to simultaneously engage the support structure at a different height than the second engaging feature.

18. The accessory system of claim 5, wherein the support structure and the accessory are configured such that the accessory may be slid along upper surfaces of the support surfaces between a first position within the basin and a second position within the basin, the first position being lower than the second position.

19. The accessory system of claim 5, wherein the accessory may be arranged in a first orientation on the support structure in which the first extension defines a generally horizontal surface and the second extension extends downward, and may also be arranged in a second orientation on the support structure in which the first extension defines an inclined planar surface and the second extension extends upward.

20. The accessory system of claim 5, wherein the first extension includes a surface configured to act as a cutting board.

21. The accessory system of claim 5, wherein the first extension is configured to provide a support for a second accessory.

22. The accessory system of claim 5, wherein a generally vertical gap is located between each of the support surfaces and a side wall of the basin, the vertical gaps configured to receive the first extension of the accessory, such that the support surfaces support the accessory for the second extension to form a generally horizontal surface.

23. The accessory system of claim 5, wherein the accessory may be arranged in a first orientation in which the first extension engages the support structure at the first height and the second extension engages the support structure at the second height, the first height being higher than the second height.

24. The accessory system of claim 23, wherein the accessory may be arranged in a second orientation in which a continuous surface of the first extension engages the support structure at different heights.

25. The accessory system of claim 5, wherein the accessory is a chassis configured to support a second accessory on the support structure at different heights within the basin, the chassis and the second accessory having complementary features configured to restrict movement therebetween.

26. The accessory system of claim 25, wherein the second accessory includes a recess configured to receive at least a portion of the chassis therein.

27. The accessory system of claim 25, wherein the second accessory is a cutting board, a colander, or a bowl.

28. The accessory system of claim 5, wherein the accessory is a cutting board, and the support structure is configured to support the cutting board at different heights within the basin.

29. The accessory system of claim 5, wherein the accessory is a colander, and the support structure is configured to support the colander at different heights within the basin.

30. The accessory system of claim 5, wherein the accessory is a bowl, and the support structure is configured to support the colander at different heights within the basin.

* * * * *